Patented June 1, 1943

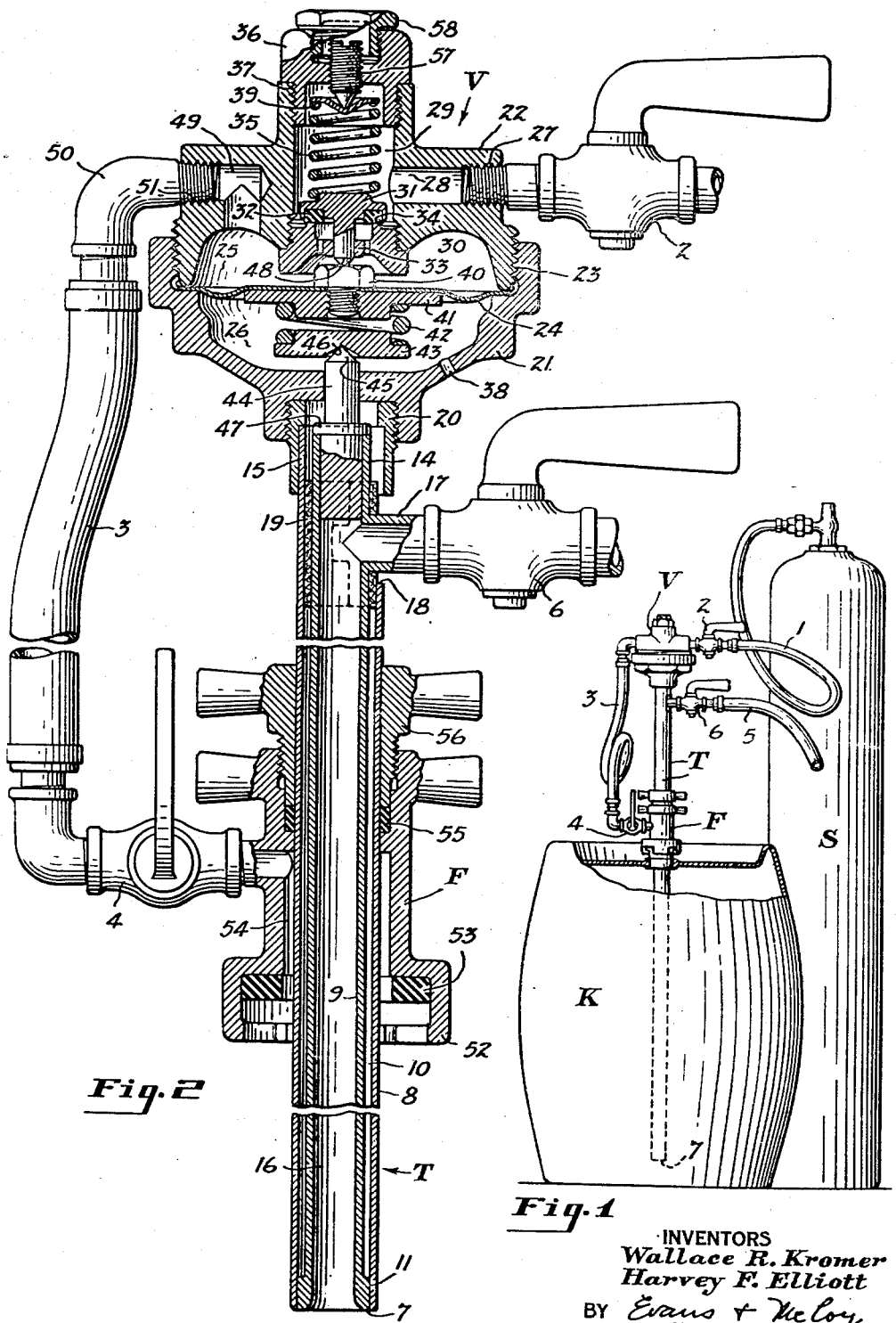

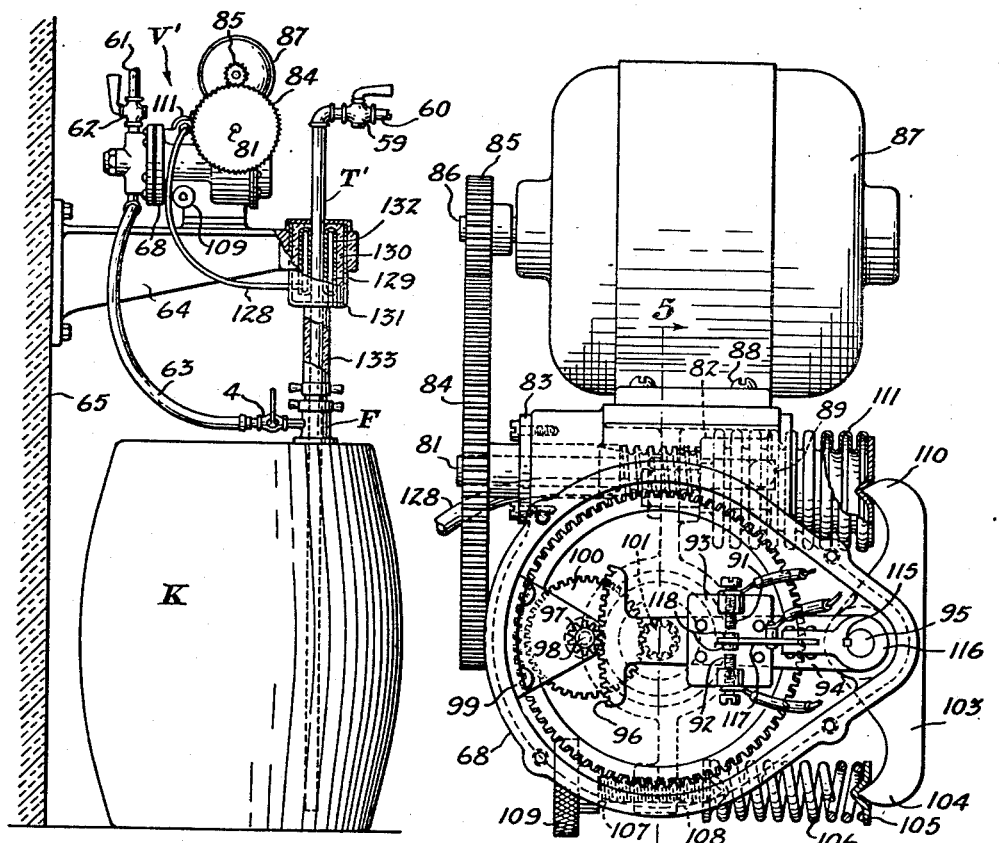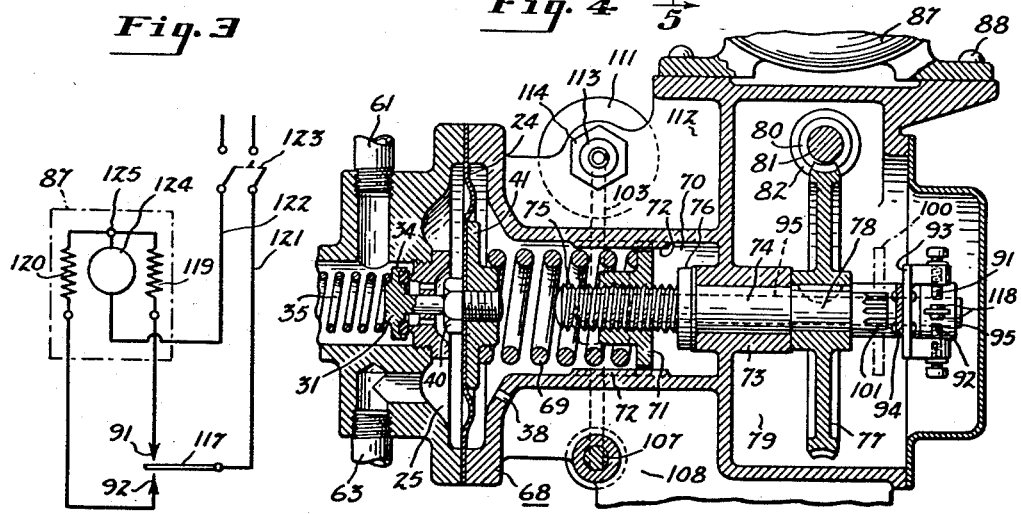

2,320,969

UNITED STATES PATENT OFFICE 2,320,969

APPARATUS FOR AUTOMATICALLY CONTROLLING GAS PRESSURE ON BEVERAGES

Wallace R. Kromer and Harvey F. Elliott, Cleveland, Ohio, assignors to The Kromer-Niernan Company, Cleveland, Ohio, a corporation of Ohio Application November 13, 1940, Serial No. 365,480

8 Claims. (Cl. 225—17)

This invention relates to an improved method of and apparatus or equipment for storing and dispensing beverages, and more particularly to an improved method and apparatus for controlling the supply of gas to a dispenser or storage receptacle for beer and the like.

Carbonated beverages, particularly beer and ale which have a quantity of carbon dioxide formed during their manufacture, are necessarily kept under pressure in order to avoid loss of the desirable carbon dioxide content. In the handling and dispensing of beverages such as beer and ale, a gas pressure is maintained in the storage or dispensing receptacle by means of a pump, supply tank or other source of gas under pressure. The receptacle or container is usually in the form of a keg or barrel and authorities differ as to the type of gas preferred to maintain pressure on the beverage. Some prefer to introduce carbon dioxide into the receptacle or keg so that the pressure is maintained on the beverage by the same kind of gas as that with which the beverage is charged. Others prefer to maintain the pressure on the beverage in the keg or receptacle by the introduction of air, as by a pump.

The exact quantity of carbon dioxide that is dissolved in the brewed beverage is considered by many to be critical, or at least to be influential on the quality and palatability of the beverage. Therefore, and in order to serve beer and ale having a uniform quality and taste, brewers and retailers are anxious to maintain the carbon dioxide content of their beverage constant and the same as that present in the beer as manufactured at the brewery. There are, however, many variables which influence the carbon dioxide content of the beer as it is served. For example, one of the chief factors influencing the carbon dioxide content of draft beer is the temperature at which the beverage is maintained in the keg or other storage receptacle from which it is to be drawn from time to time as desired. At elevated temperatures the solubility of the carbon dioxide in the beverage is decreased and the gas tends to escape from the beverage, usually resulting in an increased pressure within the keg or other storage receptacle. At low temperatures the solubility of carbon dioxide is increased and tends to dissolve in the beverage. As is well known, there is a definite relationship between the pressure of carbon dioxide gas maintained in contact with a quantity of beer, the temperature of the beer and the gas, and the quantity of gas that is dissolved in the beer. A change in any one of these factors changes at least one or the other. This relationship between pressure temperature and dissolved content of carbon dioxide is frequently graphically set forth in what is known as a pressure temperature curve. That is to say, if it is desirable to maintain in the beer a carbon dioxide content equivalent to 2½ times the volume of the beverage, then for every temperature to which the beverage is subjected, there is a corresponding pressure of carbon dioxide gas that must be maintained on the beverage. If such pressure drops without a change in temperature, carbon dioxide escapes from the beverage; while if such pressure increases without a change in temperature, carbon dioxide is absorbed or dissolved by the beer.

It is customary in the present handling of draft beer and ale to maintain a predetermined carbon dioxide or other gas pressure in the kegs or receptacles storing the beverage by means of a pressure regulating valve which receives the gas from a suitable source under a relatively high pressure and throttles the gas to the desired pressure to be maintained on the beverage in the receptacle. During the withdrawal of beverage from the receptacle or keg for consumption, an equivalent quantity of gas or carbon dioxide is automatically admitted to the receptacle by the regulating valve under the predetermined pressure so that there is normally no appreciable change in the pressure within the keg and the volumetric content of carbon dioxide in the stored beverage remains substantially constant. Operating in this manner is satisfactory so long as the temperature of the keg or other receptacle and the contained beverage is maintained constant. If, however, circumstances require that the receptacle or kegs on tap be placed in a room of varying temperature, the ordinary pressure regulating valve is ineffective to maintain a constant volumetric relationship between the beverage and the dissolved carbon dioxide. For example, if the pressure regulator is set to maintain 15 lbs. pressure on the beverage in the storage receptacle and at this pressure the correct amount of carbon dioxide is maintained dissolved in the beverage at about 40° F., then upon an increase in temperature of the receptacle and its contents some carbon dioxide will escape from the beverage, while at each lowering of the temperature of the receptacle and its contents some additional carbon dioxide will be absorbed by the beer.

It is, therefore, the principal object of the present invention to provide a generally improved method of and apparatus for handling and dispensing beverage wherein a predetermined volumetric relationship can be automatically maintained between the beverage and the dissolved carbon dioxide.

Another object is to provide an apparatus for supplying gas under pressure to stored beverage and for automatically supplying the gas at increased pressure in response to an increase in temperature of the beverage.

Another object is to provide an apparatus for supplying gas under pressure to stored beverage and for automatically decreasing the pressure of the supplied gas in response to a decrease in temperature of such beverage.

Another object is to provide apparatus for supplying gas under pressure to a quantity of beverage and for automatically maintaining a predetermined relationship between the pressure of the gas supplied and the temperature of such beverage, to increase the pressure of supplied gas in proportion to temperature increases in the beverage, and also to decrease the pressure of gas supplied to the beverage proportionately to temperature decreases of the beverage.

Another object is to provide an improved method of and apparatus for controlling the operation of a pressure regulating valve for use in association with a beverage dispensing system so as to increase and decrease the pressure of the gas delivered by the valve in proportion to temperature changes of the beverage stored in the system.

Another object is to provide a pressure regulating valve and a control therefor associated with a tap rod for use in withdrawing beverage from a keg or barrel so that temperature changes in the beverage which influence the tap rod are utilized by the latter in governing the pressure regulating valve.

Another object of the invention is to provide, in association with a pressure regulating valve, temperature responsive means for governing the valve, the temperature responsive means being associated with the tap rod of a keg or barrel of a conventional beverage dispensing system. More specifically, the invention aims to provide an improved combination tap rod and pressure regulating valve. The invention also aims to provide an improved pressure regulating valve which is motivated and which is governed by thermal responsive fluid influenced by the temperature of a metallic tap rod extending into the beverage in a receptacle or keg.

Another object is to provide a generally improved apparatus for controlling the pressure on beverage which is simple in design and construction and relatively inexpensive to manufacture. Other objects and advantages will become apparent from the following detailed description of suitable embodiments of the invention made in connection with the accompanying drawings, in which:

Figure 1 is an elevational view partly in section showing a portion of the equipment used in a beer dispensing system and embodying the present invention;

Fig. 2 is an elevational view, mainly in section, showing the tap rod and the regulating valve of the apparatus shown in Fig. 1 and enlarged with respect thereto;

Fig. 3 is an elevational view partly in section showing a modification of an invention;

Fig. 4 is an elevational view with parts removed showing the regulating valve and the control and the drive therefor of Fig. 3;

Fig. 5 is a sectional detail with parts broken broken away of the drive and the control apparatus shown in Fig. 4; and Fig. 6 is a wiring diagram showing the electrical connections for the drive and the control illustrated in Figs. 3 through 5.

Referring now to the drawings by reference numerals which indicate like parts throughout the several views, the invention is shown incorporated in beverage dispensing systems of the type in which the beer or other beverage is received in kegs or barrels and in which it is kept until withdrawn to be cooled and dispensed to the consumer. The apparatus for cooling the beverage and the faucet or faucets through which it is dispensed are not shown since these parts are conventional and the present invention relates particularly to the maintenance of a certain pressure or pressures on the beverage in the storage receptacle or container. In Fig. 1 this receptacle or container is in the form of a keg or half barrel indicated at K, and a tap rod T extends into the keg so that beverage can be withdrawn as desired. Supported on the tap rod T is a pressure regulating valve V which receives gas under pressure from a suitable source of supply such as a tank of compressed carbon dioxide indicated at S.

A suitable flexible conduit 1 connects the gas source S to the valve V and a stopcock or shut-off 2 may be provided in the usual manner. The valve V is supported on the tap rod T and the latter is received in a fitting F of conventional construction which effects a fluid-tight connection with the keg or receptacle K. A flexible conduit 3 extends between the regulating valve V and the fitting F to carry gas from the valve to the keg. If desired, a suitable shut-off valve 4 may be provided on the fitting F to close the connection of the fitting to the conduit 3. Beverage is conducted from the tap rod T to the cooling and dispensing equipment of the system through the beer line or conduit 5 which, if desired, may be provided with a stop valve 6.

As shown in Fig. 1, the tap rod T extends so that the bottom end 7 thereof is adjacent the bottom of the key K. Thus, a large portion of the tap rod is immersed in the beverage contained in the keg or receptacle and is in heat exchanging relation therewith. The tap rod T is of composite construction, having an outer tube 8 and an inner tube 9. These tubes may be of circular section and are telescopically arranged. Preferably the inner tube 9 is spaced from the outer tube to provide a circumferentially extending clearance 10. Materials having different coefficients of thermal expansion are used for the tubes 8 and 9 so that upon a change in temperature of the tubes one will expand or contract relative to the other. Preferably both the inner and outer tubes of the tap rod are of metal to obtain certain heat conduction characteristics, as well as to secure adequate strength. Various metals can be used for the tubes, such, for example, as Invar or nickel steel for the outer tube 8 and copper or brass for the inner tube 9. Preferably, the tubes are coated or plated with a suitable neutral metal or material, such as by being tinned, as is customary in beer dispensing equipment, for the purpose of avoiding reaction with the beer or other beverage. At the lower or bottom end 7 of the tap rod T the tubes 8 and 9 are secured together, as by welding or soldering, indicated at 11. Thus, upon an increase in temperature of the tubes, the inner tube expands more than the outer tube and upwardly and longitudinally with respect to upper end 15 of the outer tube 8. Upon a decrease in the temperature of the tap rod, the end 14 of the inner tube moves downwardly with respect to the upper end 15 of the outer tube 8.

Beverage enters passageway 16 of the inner tube 9 at the bottom end 7 of the tap rod and flows out of the passageway 16 through a lateral extension conduit 17 which is secured to the inner tube 9 of the tap rod and extends through an enlarged or elongated opening 18 in the outer tube 8 adjacent the upper end 15 of the latter. If desired, a split spacer or guide sleeve 19 may be provided to embrace the inner tube 9 and the extension 17 of the latter adjacent the opening 18 in the outer tube. The split sleeve 19, which may be made of fiber or similar material, thus fills the space 10 and prevents entrance of foreign material into the latter through the opening 18 as well as guiding the inner tube 9 to maintain the latter centered with the outer tube 8. During expansion and contraction of the inner tube 9 relative to the outer tube 8, the sleeve 19 may slide longitudinally in the outer tube and is sufficiently longer than the elongated opening 18 to maintain the latter closed to the space 10 in all normal positions.

A threaded collar 20 is secured on the upper end 15 of the outer tube 8, as by solder, and threadedly receives bottom casing portion 21 of the regulator valve V. Upper casing portion 22 of the valve is threaded into the lower casing portion 21, as indicated at 23, and a flexible diaphragm 24 is engaged between the valve casing portions 21 and 22 to divide the internal compartment of the valve into upper and lower chambers 25 and 26, respectively. A vent hole 38 in the lower casing portion maintains atmospheric pressure in the chamber 26.

Carbon dioxide or other suitable gas enters the valve V from the gas source through the stopcock 2 previously mentioned, which is threaded at 27 into the upper casing part 22. The gas flows through a passage 28 into a high pressure chamber 29 formed in the upper casing part 22. A passage 30 extending between the high pressure chamber 29 and the controlled pressure chamber 25 is normally provided with a poppet type valve 31 having disc 32 and a stem guided by a spider 33. The valve 31 is urged toward or against seat 34 by a helical compression spring 35 which extends through the chamber 29 and seats on a retainer 39 which bears against an adjustable screw 57 threadedly carried by a sleeve or bushing 36. This bushing is threaded at 37 into the casing part 22 and is provided with a sealing cap 58 threaded into one end of the bushing over the adjusting screw 57.

A bolt 40 extends through a hole in the center of the diaphragm 24 and is threaded into a pressure member or plate 41 which bears against the underside of the diaphragm. A helical compression spring 42, stronger than the spring 35, extends between the pressure plate 41 and a bearing member or retainer 43 carried by a spindle 44 connected to the upper end of the tube 9. The spindle 44 may be provided with a pointed end 45 which is received within a tapered socket 46 formed in the underside of the retainer 43. If desired, the lower end of the spindle 44 may be received within the upper end of the inner tube 9 to provide a plug for the latter, preventing the escape of beverage therefrom. An integral collar 47 on the spindle 44 seats against the upper end of the inner tube 9 and the spindle is guided in an opening formed in the lower casing part 21, to be held thereby in line with the stem of the valve 31.

In assembling the pressure regulating valve V the parts are adjusted so that the spring 42 supported by the member 43 carried on the spindle 44 forces the bolt 40 against end 48 of the stem of the valve 31 so that the latter is unseated against the pressure of the spring 35 and high pressure gas from the chamber 29 flows through the passage 30 into the chamber 25. Gas under pressure in the chamber 25 acts on the diaphragm 24 to counteract the force of the spring 42. Thus, the gas pressure in the chamber 25 supplements the force of the spring 35 so that the valve 31 engages the seat 34 at a predetermined pressure in the chamber 25 to thereby arrest the flow of gas into the latter chamber. By moving the screw 57 into or out of the upper part 22 of the valve casing, the pressure required in the chamber 25 to effect closing of the valve 31 can be regulated as desired.

Gas or carbon dioxide thus maintained in the chamber 25 at a predetermined pressure is conducted from such chamber through a passage 49 formed in the upper casing part 22, and thence through an elbow fitting 50 threaded at 51 into the upper casing. The flexible conduit 3 previously mentioned is connected to the elbow fitting 50 and carries the gas under regulated pressure to the valve 4 which is connected to the fitting F. This fitting has a bottom end 52 which makes suitable connection with a companion fitting on the keg K, a washer 53 of rubber or the like being provided to effect a fluid-tight joint. The gas flows through a passage 54 in the fitting F and a fluid-tight connection is established between the tap rod and the fitting above the passage 54 by means of a compressible jam washer 55 of rubber or the like which closely surrounds the tap rod and which may be compressed by means of a jam nut 56.

As the temperature of the tubes 8 and 9 of the tap rod T changes under the influence of the beverage in the keg or receptacle K in which the lower end of the tap rod is immersed, the spindle 45 is moved into or out of the casing of the regulating valve V because of the differential expansion of the tubes 8 and 9. An increase in the temperature of the tap rod forces the spindle 44 upwardly as viewed in Fig. 2, compressing the spring 42 and thereby increasing the pressure holding the valve 31 off the seat 34, so that an increased gas pressure is required in the chamber 25 to overcome the increased force in the spring 42. Thus an increased gas pressure is supplied to the receptacle or keg K through the conduit 3 in communication with the chamber 25 in the regulator valve.

Upon a decrease in the temperature of the tap rod T the spindle 44 is withdrawn slightly from the chamber 26 because of the differential contraction of the tubes 8 and 9, thereby decreasing the force exerted against the stem of the valve 31 by the spring 42. Hence, a decreased gas pressure is required in the chamber 25 to overcome the spring 42, and gas or carbon dioxide at a lower pressure is supplied to the keg K through the conduit 3.

In utilizing the apparatus shown in Figs. 1 and 2, the fitting F, with the valve 4 closed, is attached to the keg K to be tapped. The tap rod T is then inserted into the keg through the fitting F in the customary manner, the valves or stopcocks 2 and 6 being closed. The conduit 3 is connected to the valve 4, if not already so attached, and the valves 4 and 2 opened to provide a flow of gas from the source S through the valve V and into the tapped keg K. Opening valve 6 in the beverage line or conduit allows gas pressure in the keg K to force beverage upwardly through the inner tube 9 of the tap rod, through the valve 6 and the conduit 5 to the cooling and dispensing apparatus of the system.

Screw 57 is adjusted to establish a force in the spring 36, which, supplemented by the gas pressure in the chamber 25, balances the force of the spring 42 and maintains the desired pressure of gas or carbon dioxide over the beverage in the keg K. Upon a change in temperature of the beverage in the tapped keg, the inner and outer pipes 9 and 8 of the tap rod T are differentially expanded or contracted to vary the force in the spring 42 and thereby alter the pressure maintained in the upper chamber 25 of the regulating valve V. Thus the gas pressure supplied to the tapped keg is automatically adjusted to correspond to the variations in temperature to which the beverage may be subjected. The relative strengths and sizes of the springs 36 and 42 are so adjusted or proportioned that the resultant change in the pressure maintained in the chamber 25 for any given change in temperature to which the tap rod T is subjected corresponds to the change in balance pressure required to maintain the original carbon dioxide content in the beer for a like or equal change in temperature. While the action of the thermally responsive tap rod T is effective to automatically vary the pressure maintained on the beverage in accordance with the temperature variations over a normal operating range, the limits of the pressure range can be manually altered by means of the screw 57. Movement of this screw to compress the spring 35 lowers the corresponding pressure maintained on the beverage over the normal temperature range, while movement of the screw to decrease the force in the spring 35 raises the pressure maintained on the beverage for each temperature of the latter. Thus the device may be manually adjusted to alter the relationship between the temperature and the pressure of the beverage for the normal temperature range over which the automatic control is operative.

In Figs. 3 through 6 a modification of the invention is illustrated in which a metal tap rod T' of conventional construction extends into the receptacle or keg K through the fitting F and is immersed in the beverage within the keg or receptacle. This tap rod is provided with a valve 59 to which a conduit 60 may be attached for conducting beverage to the cooling and dispensing apparatus of the system in accordance with conventional practice.

Gas or carbon dioxide under pressure is conducted from a suitable high pressure source, such as tank S shown in Fig. 1, to a pressure regulating valve V' through conduit 61 provided with a shut-off valve 62 and from the valve V' is conducted to the valve 4 of the fitting F through a suitable flexible conduit 63 which corresponds to the flexible conduit 3 previously described.

The valve V' is mounted on a suitable standard such as a bracket 64, which may be secured to a wall 65 of the room in which the keg or receptacle K is kept. The diaphragm and the gas or air controlling valve of the valve V' are similar to the corresponding parts of the valve V previously described and, accordingly, are indicated by the same numerals of reference. These specific parts of the apparatus are, of course, conventional and the present invention is particularly directed to the method of and the apparatus for controlling the operation of the pressure regulating valve. In the embodiment of the invention shown in Figs. 3 through 6 the casing portion 21 previously described is replaced by casing or housing 68, the latter also having the vent 38 previously mentioned. The bolt 40 is forced against the stem of the valve 31 to unseat the latter by means of a relatively strong helical coil spring 69 which bears against the pressure or retainer plate 41 carried by the diaphragm 24. The spring 69 is disposed in a cylindrical spring chamber 70 formed in the housing 68 and bears against a circular disc-like retainer member 71 which is slidable in the chamber 70. Fins or ribs 72, formed on the inside of the walls of the chamber 70 axially of the latter, engage in notches (not shown) in the edges of the member 71 to prevent rotation of the latter. Mounted for rotation in an elongated journal 73 formed in the casing 68 is a spindle 74 having a threaded end 75 extending axially into the spring chamber 70. An integral collar 76 on the spindle 74 bears against one end of the journal 73 and the disc 71 which supports the spring 69 is threaded onto the end 75 of the spindle so that rotation of the spindle in one direction moves the disc 71 to the left, as viewed in Fig. 5, to compress the spring while rotation of the spindle in a reverse direction moves the disc 71 to the right and decreases the force exerted by the spring 69 against the diaphragm 24.

A gear wheel 77 is keyed on a reduced diameter portion 78 of the spindle 74 and is disposed against the other end of the journal 73 in gear chamber 79 formed in the casing or housing 68. The gear wheel 77 meshes with a worm 80 on a shaft 81 rotatably mounted in a journal 82 formed on the housing 68. A ball 89 disposed in the closed end of the journal 82 serves as a thrust bearing for the shaft 81. Externally of the housing the shaft 81, secured against endwise movement by a flanged bushing or thrust bearing 83, receives a large gear 84 which is meshed with a small gear 85 mounted on shaft 86 of a reversible electric motor 87. Preferably the motor 87, which may be of the universal type, is secured as by screws 88 to the housing or casing 68 of the valve V'. When the motor 87 is energized for rotation in one direction, a drive is established through the gear train 84—85 and the worm and gear 80—77 that rotates the spindle 74 to move the disc 71 to the left to increase the pressure of the spring 69 against the diaphragm 24. Energization of the motor 87 in a reverse direction rotates the spindle 74, through the gear trains described, in a reverse direction to move the disc 71 to the right and decrease the pressure of the spring 69 against the diaphragm 24.

The control of the energization of the motor 87 in forward and reverse directions is effected by means of contacts 91 and 92 adjustably mounted in opposed or confronting relation to one another on an insulating member 93 carried by an arm 94 loosely mounted at one end for limited rotational movement on a shaft 95 journaled in the housing or casing 68. The opposite end of the arm 94 is formed with an arcuate rack 96, the center of curvature of which is at the rotational axis of the shaft 95. This rack meshes with small gear 97 of a compound gear mounted on a spindle 98 supported in the chamber 79 by means of a bracket 99 secured to the inside of the casing wall. A large gear 100 of the compound gear, mounted on the shaft 98 and secured to the small gear 97 for rotation with the latter, meshes with a pinion 101 formed on the reduced diameter extreme end portion of the spindle 74. By this arrangement rotation of the spindle 74 is transmitted to the pivoted arm 94 through the reduction gearing 100—97 so that limited pivotal movement is imparted to the arm 94, slightly raising or lowering the block 93 carrying the contacts 91 and 92 (as viewed in Fig. 4) depending upon whether the motor 87 is rotating the spindle 74 to increase or decrease the force against the diaphragm 24.

Externally of the housing or casing 68 the shaft 95 has secured thereon a walking beam 103. End 104 of the walking beam engages a retainer or bearing member 105 on one end of a helical coil compression spring 106. The other end of the spring bears against the end of a screw 107 threaded through a web 108 formed on the housing 68. The screw is provided with a knurled wheel 109 for adjustment to vary the compression in the spring 106.

End 110 of the walking beam bears against one end of a metallic bellows 111 supported by a web 112 of the housing 68. An externally threaded extension 113 attached to the bellows extends through the web 112 and receives a nut 114. As shown in Fig. 4, the axis of the bellows 111 parallels the axis of the compression spring 106 so that expansion of the bellows pivots the walking beam 103 and the shaft 95 against the force of the spring 106 in a clockwise direction, while contraction of the bellows 111 results in a pivotal movement of the walking beam 103 and shaft 95 in a counterclockwise direction under the influence of the spring 106.

Mounted on the shaft 95 and secured against relative rotation as by a key 115 is an arm 116 formed of non-conducting or insulating material, such as Bakelite or hard rubber. A spring metal extension 117 carried by the arm 116 is provided with a double contact 118 disposed between the contacts 91 and 92 of the insulating member 93. Normally, the contact 118 is spaced from each of the contacts 91 and 92 when the arms 94 and 95 are in alignment or neutral position as illustrated in the figures. As previously mentioned, the arm 94 carrying the insulating member 93 is rotatable on the shaft 95, while the arm 116 carrying the contact 118 rotates or pivots with the shaft 95. Accordingly, the contact 118 may be brought into engagement with either the contact 91 or the contact 92, depending upon the relative pivotal positions of the arms 94 and 116 to establish an electrical connection between the respective contacts.

A pair of opposed or reversed field windings are provided in the motor 87 and are indicated at 119 and 120 of the wiring diagram, Fig. 6. For controlling the direction of rotation of the shaft 86 of the motor, the field winding 119 is connected to contact 91 while the field winding 120 is connected to the contact 92. A suitable source of electric current is connected by wires 121 and 122 through a switch 123 to the contact 117 and armature winding 124 of the motor. The field windings 119 and 120 and the armature winding 124 of the motor are connected together as indicated at 125. While the field coils 119 and 120 have been shown for simplicity connected directly to the power source through the contacts 117 and 91 and 92, respectively, it is obvious that a relay of conventional form might be used in order to lower the current through the contacts and thereby reduce burning and deterioration of the latter. The motor 87 can be energized for operation in a forward direction by establishing an electrical connection between the contact 117 and the contact 91, while an electrical connection between the contact 117 and the contact 91 energizes the motor for operation in a reverse direction.

The bellows 111 is filled with a suitable thermoresponsive fluid, a number of which are now well known, and are commercially used in thermostats and other heat responsive devices. A conductor or tube 128 is connected to the bellows 111 through the extension 113 and extends to a double walled tubular sleeve or "bulb" 129 in insulating material 130 and disposed in a casing 131 supported by the bracket 64. The casing 131 is formed with top and bottom end openings aligned with the sleeve 129 so that the tap rod can be passed through the casing and circumferentially embraced by the sleeve 129, the latter slidingly engaging the tap rod. The thermal responsive fluid within the bellows 111 is continuous through the conductor 128 and fills chamber 132 of the double walled sleeve 129. In this manner the thermal responsive fluid is subjected to the temperature of beverage drawn through the tap rod T' and because of the heat conductivity of the tap rod is also subjected to the temperature of beverage within the keg K. Desirably, an insulating sleeve or jacket 133 may be provided for the portion of the tap rod extending between the casing 131 of the thermostatic element and the fitting F attached to the keg K. Thus, heat absorption from the atmosphere by the tap rod T' between the thermostatic bulb or sleeve 129 and the beverage in the keg K is minimized and the response of the expansible fluid in the bulb or sleeve 129 more closely follows the temperature condition of the beverage in the keg.

Upon an increase in temperature of beverage flowing or drawn through the tap rod T' or in the keg K, the thermal responsive fluid in the double walled sleeve or bulb 129 is heated because of the metallic contact between the tap rod and the sleeve. The heating of the thermal responsive fluid increases the pressure of the same, and this increased pressure is transmitted through the conductor tube 128 to the bellows 111, causing the latter to expand. This expansion of the bellows 111, resulting from an increase in temperature of the beverage, pivots the shaft 95 in a clockwise direction, as viewed in Fig. 4, acting through the walking beam 103 and against the force of the spring 106. This movement of the shaft 95 shifts the arm 116 relative to the arm 94 so that the contact 118 engages the contact 91 and establishes an electrical connection therebetween. When the switch 123 is closed, the motor 87 is thus energized through the field coil winding 119 to rotate the shaft 86 in a forward direction, which, through the gearing previously mentioned, rotates the spindle 74 in a clockwise direction as viewed in Fig. 4, thereby compressing the spring 69. The increased force in the spring 69 moves the diaphragm 24 against the pressure of the gas in the chamber 25 to raise the valve 31 off the seat 34, thereby admitting gas or carbon dioxide from the source to flow into the chamber 25 of the regulator valve and thence into the keg K, so as to provide an increased gas or carbon dioxide pressure in the keg. The energization of the motor 87 continues to increase the force in the spring 69 until the rotation of the spindle 74 acting through the double gear 97—100 and the rack 96 moves the arm 94 to shift the contact 91 away from the contact 118. When the motor 87 is thus de-energized, the force in the spring 69 has been increased to maintain a predetermined pressure in the keg or receptacle K, which corresponds to the increased temperature and as determined by the thermal responsive fluid in the sleeve or bulb 129.

In the event that the temperature in the receptacle or keg K falls, the temperature of the tap rod T is likewise lowered either through the drawing of beverage from the keg through the tap rod or by heat conductivity from the beverage stored in the keg. The lowering of the tap rod temperature as determined by the thermal responsive fluid in the sleeve or bulb 129 decreases the pressure of such fluid, resulting in the contraction of the bellows 111 by the force in the spring 106 acting on the walking beam 103 to pivot the latter and the shaft 95 in a counter-clockwise direction as viewed in Fig. 4. In this manner the contact 118 engages the contact 92 to establish electrical connection therebetween and to energize the motor 87 through the field coil 120 for reverse operation. The reverse operation of the motor drives the spindle 74 through the gearing connections previously described to rotate in a counterclockwise direction in Fig. 4, thereby allowing the spring 69 to expand. The lessened force in this spring decreases the pressure maintained in the chamber 25 of the regulator valve and the keg K, as is well known. Reverse operation of the motor 87 continues until the spur gear 101 acting through the double gear 97—100 and the rack 96 moves the arm 94 counterclockwise relative to the arm 118 to separate the contacts 118 and 92. When the motor is thus stopped the force in the spring 69 is maintained constant to retain the newly established pressure in the receptacle or keg K until the motor is again energized in either a forward or a reverse direction as demanded by the state of the thermal responsive fluid in the bulb or sleeve 129 influenced by a change in the beverage temperature.

For each setting of the valve V' there is a predetermined pressure range over which the control apparatus is automatically operative to vary the pressure maintained on the beverage in response to temperature changes of the beverage over a normal temperature range. By rotating the screw 107 the normal compression force in the spring 106 can be manually adjusted to change the limits of such pressure range. Increasing the compression of the spring 106 lowers the limits of the range of pressure over which the control is operative, while decreasing the spring compression raises the limits of such pressure range. Accordingly, the present invention provides not only an automatic control for governing the pressure on the beverage in response to temperature changes but also a manual control whereby the corresponding pressures maintained for all temperatures over a normal operating range can be regulated.

By the present invention an improved method of storing a gas charged beverage is provided wherein the beverage in a closed container has a gas pressure maintained thereon and such pressure is automatically increased by the introduction of additional gas into the container in response to an increase in temperature of the stored beverage. By this improved method the pressure of the supply gas is varied in response to temperature changes of the beverage and a pressure is assured which is sufficient at all times to retain the desired quantity of carbon dioxide gas in solution in the beverage.

In its preferred embodiments the present invention contemplates apparatus which includes a pressure regulating valve governed in response to the temperature of the beverage so that the established pressure maintained on the beverage is proportional to the temperature of the latter.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What we claim is:
1. Beverage dispensing apparatus comprising a storage receptacle for the beverage, a multiple metallic tap rod extending into the receptacle and having one end immersed in the beverage for withdrawing the same as desired, a pressure regulating valve and means connecting the same to the receptacle for supplying gas under variable pressure to the latter, and means connecting the valve to different parts of the tap rod to govern the valve in response to relative expansion and contraction of said parts of the rod.

2. Beverage dispensing apparatus comprising a storage receptacle for the beverage, a multiple part metallic tap rod extending into the receptacle and having one end immersed in the beverage for withdrawing the same as desired, a pressure regulating valve mounted on the tap rod and having a gas connection with the receptacle for supplying gas under variable pressure to the latter, and means governing the valve to vary the pressure of the supplied gas in response to relative expansion and contraction of different parts of the rod.

3. Beverage dispensing apparatus comprising a storage receptacle for the beverage, a tap rod extending into the receptacle and having inner and outer parts formed of materials having different thermal expansion, a pressure regulating valve for supplying gas under variable pressure to the receptacle, and separate means connecting the valve to the inner and outer parts of the tap rod to govern the valve in response to different expansion and contraction of the tap rod parts.

4. Beverage dispensing apparatus comprising a storage receptacle for the beverage, a tap rod extending into the receptacle and having inner and outer parts formed of materials having different thermal expansion, a pressure regulating valve for supplying gas under variable pressure to the receptacle, said valve having a casing supported on the outer rod part and a diaphragm governing the pressure of supplied gas, and means connecting the inner rod part to the diaphragm to control said gas pressure in response to different expansion and contraction of the inner and the outer parts of the tap rod.

5. Equipment for storing beverage charged with gas comprising a closed container for retaining the beverage under pressure, a metallic heat conducting tap rod extending into the container and immersed in the beverage, means for supplying gas to the container including an adjustable pressure regulating valve, and means having connection with the valve and with the tap rod and operative in response to temperature changes of the tap rod to control the valve and vary the pressure at which gas is admitted to the container whereby the pressure of the gas is regulated in accordance with temperature changes of beverages retained in static condition, said last named means including a tube disposed within and supported by the tap rod and extending to the lower portion of the tap rod.

6. Equipment for storing beverage charged with gas comprising a closed container for retaining the beverage under pressure, a metallic heat conducting tap rod extending into the container and immersed in the beverage, means for supplying gas to the container including an adjustable pressure regulating valve having a diaphragm, means having connection with the valve and with the tap rod and operative in response to temperature changes of the tap rod to control the valve and vary the pressure at which gas is admitted to the container, said last named means including a tube disposed within and supported by the tap rod and extending to the lower portion of the tap rod, said connection of the control means to the valve including a spring arranged to bear against one side of the valve diaphragm, and a manually adjustable spring arranged to bear against the other side of the diaphragm for altering the relationship between the temperature of the tap rod and the pressure of the gas admitted to the container.

7. In beverage dispensing apparatus comprising a storage receptacle for holding a mass of beverage and a regulating valve for controlling gas supplied under variable pressure to the receptacle, a tubular tap rod extending into the receptacle, an element extending longitudinally through the rod and so disposed as normally to be immersed in the mass of beverage in the container and in direct heat exchanging relation thereto, and an operative connection between said element and the valve for governing the latter.

8. Beverage dispensing apparatus comprising a storage receptacle for the beverage, a tap rod extending into the receptacle and having inner and outer parts formed of materials having different thermal expansion, a pressure regulating valve for supplying gas under variable pressure to the receptacle, said valve having a casing supported on the outer rod part, and means so connecting the inner rod part to the valve as to control the pressure of gas supplied in response to different expansion and contraction of the inner and outer parts of the tap rod.

WALLACE R. KROMER.
HARVEY F. ELLIOTT.

CERTIFICATE OF CORRECTION.

Patent No. 2,320,969. June 1, 1943.

WALLACE R. KROMER, ET AL.

It is hereby certified that error appears in the printed specification of the above numbered patent requiring correction as follows: Page 6, second column, line 27, claim 1, before the word "metallic" insert --part--; and that the said Letters Patent should be read with this correction therein that the same may conform to the record of the case in the Patent Office.

Signed and sealed this 12th day of October, A. D. 1943.

(Seal)

Henry Van Arsdale,
Acting Commissioner of Patents.